May 22, 1951 W. Y. PAN 2,553,672

AMPLIFICATION AND DEMODULATION SYSTEM

Filed Sept. 24, 1948

INVENTOR
WEN YUAN PAN
BY Philip G. Cooper
ATTORNEY

Patented May 22, 1951 2,553,672

UNITED STATES PATENT OFFICE 2,553,672

AMPLIFICATION AND DEMODULATION SYSTEM

Wen Yuan Pan, Collingswood, N. J., assignor to Radio Corporation of America, a corporation of Delaware Application September 24, 1948, Serial No. 50,978

10 Claims. (Cl. 250—20)

This application is a continuation in part of the copending Pan application Serial No. 777,256, filed October 1, 1947, and now abandoned.

This invention relates to amplification and demodulating systems, more particularly to such systems in which signal-modulated waves are amplified and then demodulated by electron-discharge structure held within a common enclosure.

In the design of combined amplification and demodulating systems such as those utilized in radio receivers it has been the general practice to employ electron-discharge demodulators and to combine this type of demodulator with an electron-discharge amplification stage connected to amplify the low-frequency demodulated output. In the interest of simplicity and cost this demodulator-amplifier combination has electron-discharge elements all contained in a single tube envelope or enclosure.

For some purposes the presence of the demodulator elements in the low-frequency amplification section is undesirable. Thus it is well-known that in the final or power-amplification stage of low frequency amplifiers, an appreciable amount of distortion is introduced especially if a high intensity output is desired. It is also well-known that if equal and oppositely phased signal portions are amplified in a so-called push-pull stage by separate amplification sections having their outputs connected in opposition, a very high level of output can be developed with a great deal of the distortion eliminated by being balanced out in the opposing outputs of the individual sections. Where it is desired to incorporate the favorable characteristics of a push-pull stage in the amplifier and the complications and expense of a phase-inverting transformer-input to the push-pull stage is to be avoided, an auxiliary phase-inverting means must be provided. It is common practice to take advantage of the phase-reversing property of an additional electron-discharge amplification unit to provide an inexpensive input arrangement for push-pull systems. For even greater reduction in cost, the phase-inverting amplification unit is incorporated in the same tube envelope that houses a pre-amplification or driver stage inasmuch as such twin-section electron-discharge amplifiers are standard inexpensive articles of commerce. This type of arrangement makes a very desirable combination for amplifying low-frequency signals such as audible signals to be reproduced at high intensity levels by signal reproducers such as loudspeakers. Unfortunately the necessity for having a demodulator as part of the low-frequency amplification system prevents the use of such a desirable combination for the reason that there are no suitable inexpensive presently available articles that make it possible to so include the demodulator section. Furthermore the incorporation of the electron-discharge elements of an electron-discharge demodulator in the same envelope with electron-discharge elements of a high-frequency signal-modulated carrier amplifier has been found to introduce undesirable selectivity characteristics into the amplification.

Another disadvantage of combining in a single tube the electron discharge sections of the demodulator and the demodulated signal amplifier, is that there is sufficient inherent coupling between them due to their proximity in the tube to pass signals at a level often too high for the required minimum attenuation of the amplifier output when the attenuation is inserted between the demodulator and this amplifier section, as is usually the case.

Among the objects of the present invention is a simple and inexpensive combination of a demodulator and a good quality high-frequency amplifier for modulated electric waves which makes it unnecessary to include the demodulator in the demodulated signal amplifier.

Further objects of the invention include an inexpensive signal receiving system having a satisfactory electron-discharge high frequency amplifier combined in a single envelope with an electron-discharge demodulator.

A still further object of the invention is to eliminate the effects of capacitance coupling between two inductively coupled inductance elements of a circuit supplying a modulated carrier signal to a diode detector.

Another object of the invention is to improve the selectivity of signal receivers employing a dual-type electron-discharge tube comprising an amplifier for modulated waves and a diode detector associated with a common electron-supplying cathode, and to make the improvement in a simple way that may be employed in inexpensive receivers.

The above as well as other objects of the invention will be more readily understood from the following description of an exemplification thereof, reference being made to the accompanying drawings wherein.

According to the invention a high frequency electron-discharge amplifier for signal-modulated waves and an electron-discharge demodulator have their electron-discharge elements combined in a single envelope or tube and the inherent capacitance between these elements is compensated for so that the amplifier has good response characteristics. The amplifier output electrodes are tranformer-coupled to the demodulator electrodes so that undesired capacitive coupling to one output lead of the transformer, which distorts the amplification selectivity, is compensated for by the insertion of an additional capacitance to the other output lead of the tranformer. This develops in the output a signal substantially equal and opposite to that produced by the undesired coupling and these opposing signals cancel each other and the circut behaves as if neither were present. An impedance to carrier frequency waves inserted between the transformer output and the common return or ground conductor facilitates the compensation.

Figure 1:
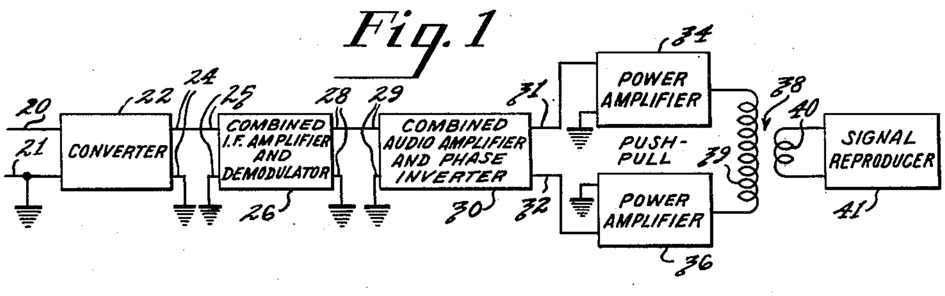
Fig. 1 is a schematic block diagram of one form of radio receiver system embodying the invention.

Fig. 1 shows a block diagram of a practical construction according to the invention. Antenna input leads 20, 21 which may be connected to any convenient form of antenna circuit such as a loop, elongated wire or dipole, supplies carrier waves amplitude-modulated by signals, to a tuned converter stage 22. One lead, 21, is shown as grounded to a common signal return conductor. The converter 22 preferably includes a single electron-discharge or so-called vacuum tube and is connected to selectively receive modulated carrier waves in a predetermined frequency range, amplify and beat or heterodyne them with locally-generated mixer waves to shift their frequency to a fixed channel. The specific details of the converter circuits by which the tube performs these functions are well known in the art and form no part of the present invention. Any desired converter arrangement may be used, a typical one being shown in U. S. Patent No. 2,417,182, granted March 11, 1947. Other suitable circuits are described in the copending U. S. patent application by W. Y. Pan, Serial No. 16,934, filed March 25, 1948.

The converter stage has output leads 24 connected to the input leads 25 of a combined so-called intermediate frequency amplification and demodulation unit 26. In this unit the heterodyne output of the converter 22 is further amplified and then demodulated to recover the signal modulations at output leads 28. One of each of the connecting leads 24, 25 as well as the output leads 28 is shown as the common return or ground conductor. The details of one construction for unit 26 are shown below.

From the output of unit 26, the demodulated signals are supplied to a combined audio-frequency amplifier and phase inverter unit 30 having input connectors 29 and a pair of output connectors 31, 32. A preferred construction of such a unit utilizes a single dual-type electron-discharge tube having two amplification sections one of which may be connected to amplify the signals in the conventional manner and deliver them between output conductor 31 and the common return lead. The other section is then connected to take a portion of the thus amplified output signal voltage and further amplify this portion to reverse its polarity or phase, raise it to a level substantially equal to that at conductor 31, and deliver these reversed polarity signals between conductor 32 and the common return lead. Alternatively one tube section may be connected as an ordinary amplifier, the other section taking the entire amplified output and splitting it into two equal and oppositely-phased portions, as is well-known. The specific circuit connection details of the dual-type tube in this unit form no part of the present invention and any convenient arrangement may be used as shown for example on pages 12 and 10 of the Radiotron Designer's Handbook, third edition, published in 1941 by The Wireless Press.

Units 34, and 36 are separate electron-discharge amplification sections which together form the push-pull output stage of the system. Each section may be conventionally arranged to amplify one of the oppositely phased signals developed between the corresponding conductor 31, 32 and the common return, and to deliver the resulting amplified output to a terminal of the primary winding 39 of an output transformer 38. The oppositely phased amplified signals combine in the transformer to deliver from its secondary winding 40 to a signal reproducer 41 such as a loudspeaker, the desired high-quality high level signals necessary to operate the reproducer. The circuit details of sections 34, 36 are not a part of this invention and may be of any convenient form such as is found in the last mentioned handbook.

It is noted that in the embodiment of Fig. 1, the invention utilizes only a single electron-discharge tube in each of the units 22, 26, 30, 34 and 36. Accordingly there is provided a superheterodyne type radio with push-pull output and with only five tubes. Power necessary to energize the five-tube arrangement may be supplied by batteries or from the standard commercial alternating current power sources without the use of additional tubes. For providing D.-C. electron-discharge energy from the alternating current supply, a rectifier such as a dry disc or metal contact type may be utilized. The resulting arrangement can also be connected for A. C.-D. C. operation by using transformerless electron-discharge heater circuits as is well-known. If desired a rectifier of the electron-discharge tube type may also be used to provide the necessary D.-C. power.

Figure 2:
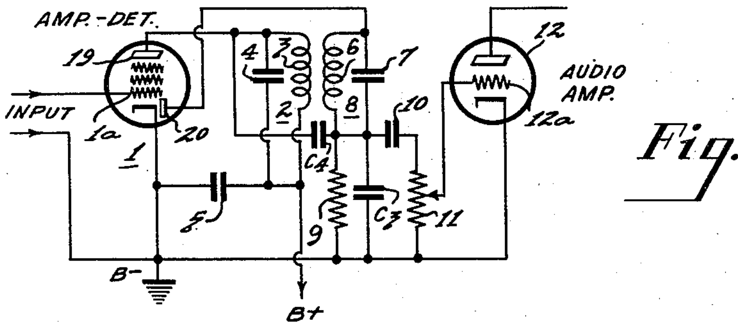
Fig. 2 is a circuit diagram of a portion of the system of Fig. 1.

Referring to Fig. 2, a radio-frequency signal is applied to grid 1a of vacuum tube 1 and the signal at amplifier plate or anode 19 of tube 1 is applied to tuned circuit 2 comprising inductance 3 and capacitor 4, the plate being supplied with D.-C. voltage B+ from a suitable source, not shown. Radio-frequency currents return to the cathode of tube 1 through bypass capacitor 5. It will be understood that, as used herein, the expression "radio-frequency" includes frequencies commonly designated as intermediate frequencies.

The radio-frequency currents in inductance 3 induce corresponding voltages in inductance 6 which, with capacitor 7, forms a second tuned circuit 8. Circuits 2 and 8 ordinarily will be tuned to substantially the same frequency and inductances 3 and 6 are so positioned that the inductive coupling therebetween readily transfers signals voltages of a predetermined frequency which, for convenience, will be assumed to be 455 kilocycles per second. The voltage induced across circuit 8 is applied to diode plate 20 and through capacitor $C_3$ to the cathode of tube 1. Capacitor $C_3$ is connected in parallel with resistor 9 and with the branch circuit including capacitor 10 and potentiometer 11, connected to grid 12a of audio amplifier tube 12. Currents rectified by the diode develop rectified voltages across resistor 9. The function of capacitor $C_3$ is to by-pass the radio-frequency carrier components of the demodulated, rectified voltages to the cathode of tube 1. Capacitor $C_3$ must not be so large as to by-pass effectively the higher audio-frequency components, and it therefore must offer a substantial impedance to radio-frequency signals. However, the impedance of capacitor $C_3$ at carrier radio-frequencies usually will be low compared to the impedance of the elements connected in parallel therewith, and for purposes of analysis such other elements temporarily may be ignored. Capacitor 10 applies the demodulated signal voltages across potentiometer 11, from which they are amplified by tube 12.

There is necessarily a certain small capacitance between the two plates of tube 1 due to their proximity. To eliminate the effects of this capacitance, in accordance with the invention, capacitor $C_4$ is connected between the amplifier plate of tube 1 and the low potential end of inductance 6.

Figures 3, 4:
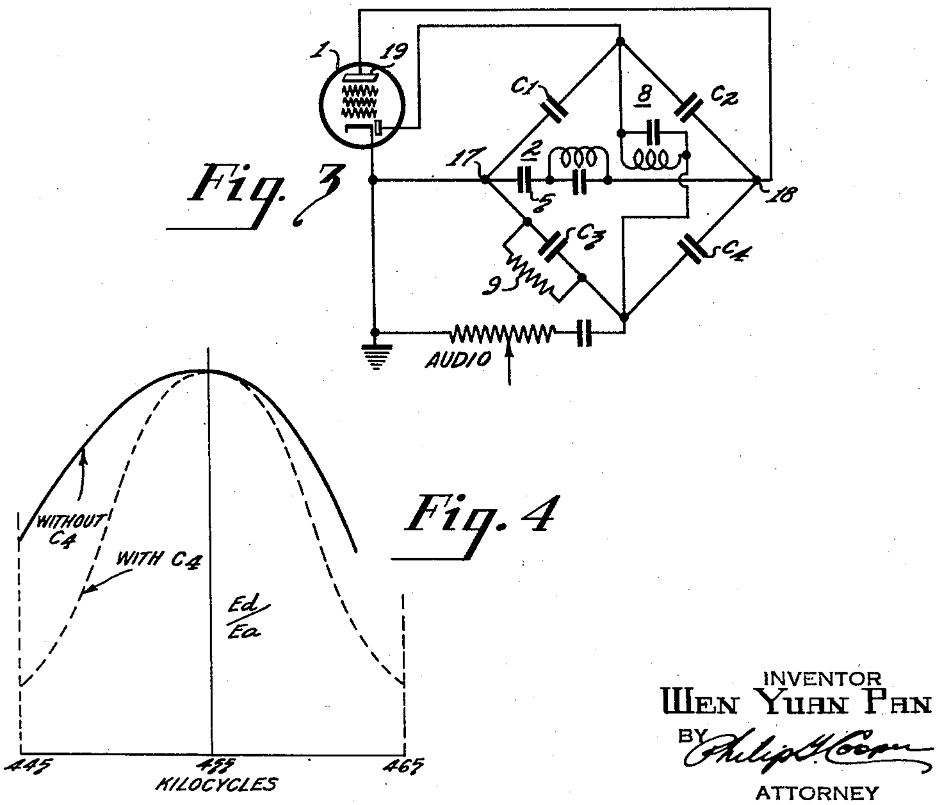
Fig. 3 is a simplified equivalent arrangement of the circuit of Fig. 2 to more clearly show how the invention operates.
Fig. 4 is a graphic representation of the improvement in selectivity achieved by a typical embodiment of the invention.

In Fig. 3, a circuit arranged in the form of a Wheatstone bridge is equivalent to that of Fig. 2, with the input capacitance of the diode portion of tube 1 being shown as a separate capacitor $C_1$ and with the plate-to-plate capacitance of tube 1 being indicated as a separate capacitor $C_2$. In accordance with the well-known Wheatstone bridge theory, the radio-frequency signal from tube 1 applied between points 17 and 18 will produce no voltage across circuit 8 if the bridge is balanced, that is, if the ratio of $C_4$ to $C_2$ is equal to the ratio of $C_3$ to $C_1$. However, such voltage applied between points 17 and 18 will cause current to flow through circuit 2, resulting in an induced voltage in circuit 8. Thus capacitor $C_4$, when the bridge is balanced, nullifies the effect of capacitor $C_2$ in transferring energy to circuit 8 without appreciably affecting the inductive coupling between circuits 2 and 8.

It should not be supposed, however, that the purpose of the invention is to neutralize completely the effect of capacitor $C_2$. The goal is to prevent absolutely the transfer of energy through capacitor $C_2$ to circuit 8, and thereby to reduce to a negligible amount the transfer of energy through capacitor $C_2$ to the diode detector. This goal readily is achieved in a wholly satisfactory manner, whereas the complete elimination of energy transfer through capacitor $C_2$ to the diode detector would be much more difficult and unnecessary. Instead of reaching the desired result by the more direct but impractical expedient of making the diode the diagonal of a balanced bridge, substantially the same result is achieved by the relatively simple expedient of making circuit 8 the diagonal. The diode then forms one leg of the bridge, but it is a low-impedance leg and, therefore, the voltage across it is low.

If, in Fig. 3, both circuits 2 and 8 were removed, voltage from the plate of tube 1 would pass through capacitor $C_2$ and be applied to the diode portion of tube 1. Such voltage transfer would be of little importance, however, since the impedance of $C_2$ ordinarily would be much higher than the impedance of $C_1$. On the other hand, nearly all the voltage transferred to circuit 8 will be applied to the diode, and it therefore is desirable that voltage transferred to circuit 8 by capacitance coupling absolutely be eliminated. This is accomplished, in accordance with the invention, by making circuit 8 the diagonal of the balanced bridge. Of course, this arrangement in no way interferes with the desired transfer of energy to circuit 8 by inductive coupling.

The true significance of the invention will be seen if, in Fig. 3, it is imagined for the moment that capacitor $C_4$ is not present. Capacitances $C_1$ and $C_3$ then may be regarded as part of tuned circuit 8, which offers high impedance to currents at its resonant frequency. In this condition, radio-frequency energy from tube 1 effectively will be transferred through capacitance $C_2$, even though $C_2$ be very small, to the high-impedance circuit 8, thence to the diode section of tube 1 and the audio-frequency circuit. On the other hand, and in accordance with the invention, with $C_4$ in place in Fig. 3 radio-frequency energy from tube 1 transferred through capacitor $C_2$ to tuned circuit 8 will be exactly offset by the energy transferred through capacitor $C_4$ and capacitor $C_2$ thus will be wholly ineffective to transfer energy to tuned circuit 8.

As mentioned, without $C_4$ in Fig. 3, energy readily will be transferred from amplifier plate 19 of tube 1 through capacitance $C_2$ to the tuned circuit which comprises circuit 8 slightly modified by capacitors $C_1$ and $C_3$. Also, of course, energy will be transferred from amplifier plate 19 to circuit 8 by inductive coupling between circuits 2 and 8. The reason for the adverse effect on selectivity of this capacitance coupling in combination with inductive coupling is rather involved and, in any case, unnecessary of complete explanation, since the adverse effect is an easily demonstrable experimental fact. Briefly stated, the adverse effect is due to various time relations (phase positions) of the voltage components transferred to circuit 8 by capacitance and inductive coupling at different frequencies, these components add less effectively, or even subtract, at the frequency of the desired signal (resonance) and they add more effectively at other nearby frequencies of undesired signals. The effect of capacitance coupling usually is to broaden the range of frequencies receivable by inductive coupling, and it increases unequally the response of the receiver at frequencies higher and lower than resonance. Capacitance coupling in itself is not bad, and it sometimes is used intentionally without inductive coupling, but the combination of the inductive and capacitance coupling in circuits of the type herein described results in poorer selectivity than would be obtained with inductive coupling alone.

Typical selectivity curves taken without $C_4$ and with $C_4$ are shown in Fig. 4, the difference between the two curves representing substantially the effect of capacitance coupling. The ratio of the voltage at the diode $E_d$ to the voltage from the amplifier $E_a$ is plotted for various frequencies near resonance.

The curve with capacitance coupling effective, that is, without $C_4$, is unsymmetrical about the resonance frequency of 455 kilocycles per second because at 445 kilocycles per second, for example, the inductively coupled and capacitively coupled components of voltage $E_d$ add almost directly, whereas at 465 kilocycles per second they add less effectively. With capacitor $C_4$, the effect of capacitive coupling is eliminated and the response curve due to inductive coupling is substantially symmetrical and much more favorable to the reception of signals at resonance compared to the reception of undesired nearby signals.

It will be understood that the capacitance $C_4$ referred to in the preceding paragraph is of the proper magnitude substantially to balance the bridge shown in Fig. 3. In a typical case, using as tube 1 a tube of the 65F7 type, the input capacitance $C_1$ of the diode was 5.3 micromicrofarads. The plate-to-plate capacitance $C_2$ of tube 1 was 0.8 micromicrofarad. The diode filter capacitance $C_3$ was about 100 micromicrofarads, the impedance in parallel therewith being high enough to be neglected, and balancing capacitor $C_4$ was about 15.1 micromicrofarads with tuned circuits 2 and 8 being resonant at 455 kilocycles per second. Capacitance $C_4$ is not unduly critical and substantially the full improvement in selectivity will be achieved if it is within, say, 15 or more percent of its correct value. If the necessary impedance in parallel with capacitor $C_3$ should be so low that it cannot be neglected, then capacitor $C_4$ should be varied to most nearly balance the Wheatstone bridge in accordance with well known principles.

While several exemplifications of the invention have been indicated and described above, it will be apparent to those skilled in the art that other modifications may be made without departing from the scope of the invention as set forth in the appended claims.

What is claimed is:

1. In a modulated carrier wave receiving system of the type including means for amplifying and frequency converting a received carrier wave to a modulated intermediate frequency signal, an intermediate frequency signal amplifier and demodulator comprising an electron discharge device having a cathode, a plurality of grids including a control grid, an amplifier plate, and a diode plate, said control grid and said cathode being connected to said amplifying and converting means whereby said modulated intermediate frequency signal is impressed between said grid and said cathode, a first tuned circuit coupled to said amplifier plate, a second tuned circuit coupled to the first tuned circuit for deriving said modulated intermediate frequency signal therefrom, one side of said second tuned circuit being connected to said diode plate, an impedance device connected between the other side of said second tuned circuit and said cathode, a reactance element connected between the said other side of said second tuned circuit and said amplifier plate, whereby energy transfer through the interelectrode capacitance between said amplifier plate and diode plate is substantially eliminated, a modulation wave amplifier connected to said impedance device, and a utilization circuit coupled to said modulation wave amplifier for deriving said demodulated signal therefrom.

2. In a modulated carrier wave receiving system of the type including means for amplifying and frequency converting a received carrier wave to a modulated intermediate frequency signal, an intermediate freqeuncy signal amplifier and demodulator comprising an electron discharge device having a cathode, a plurality of grids including a control grid, an amplifier plate, and a diode plate, circuit means connected between said amplifying and converting means and said control grid and said cathode for impressing said modulated intermediate frequency signal between said grid and said cathode, a first tuned circuit coupled to said amplifier plate, a second tuned circuit magnetically coupled to the first tuned circuit for deriving said modulated intermediate frequency signal therefrom, one side of said second tuned circuit being connected to said diode plate, an impedance device connected between the other side of said second tuned circuit and said cathode, a capacitor connected between the said other side of said second tuned circuit and said amplifier plate whereby energy transfer through the interelectrode capacitance between the amplifier plate and the diode plate is substantially eliminated, a modulation wave amplifier, circuit connections between said impedance device and said modulation wave amplifier whereby said demodulated signal is supplied to said modulation wave amplifier, a signal reproducer, and circuit means connected between said modulation wave amplifier and said signal reproducer.

3. In a modulated carrier wave receiving system of the type including means for amplifying and frequency converting a received carrier wave to a modulated intermediate frequency signal, means for amplifying and demodulating said intermediate frequency signal comprising an electron discharge device having a cathode, a plurality of grids including a control grid, amplifier plate, and a diode plate, said control grid and said cathode being connected to said amplifying and frequency converting means whereby said intermediate frequency signal is impressed between said grid and said cathode, a first tuned circuit coupled to said amplifier plate, a second tuned circuit coupled to said first tuned circuit for deriving said modulated intermediate frequency signal therefrom, one side of said second tuned circuit being connected to said diode plate, an impedance device connected between the other side of said second tuned circuit and said cathode, said impedance device comprising a diode load resistor and a capacitor connected in parallel, and a second capacitor and resistor connected in series across said diode load resistor, a reactance element connected between the said other side of said second tuned circuit and said amplification plate whereby energy transfer through the interelectrode capacitance between the amplifier plate and the diode plate is substantially eliminated, a modulation wave amplifier connected to said second resistor and a utilization circuit coupled to said modulation wave amplifier.

4. In a modulated carrier wave receiving system, a carrier wave amplifier and demodulator comprising an electron discharge device having a cathode, a plurality of grids including a control grid, an amplifier plate, and a diode plate, circuit means connected between said control grid and cathode for impressing said modulated carrier wave between said grid and said cathode, a first tuned circuit coupled to said amplifier plate, a second tuned circuit coupled to the first tuned circuit for deriving a carrier wave therefrom, one side of said second tuned circuit being connected to said diode plate, an impedance device connected between the other side of said second tuned circuit and said cathode, a reactance element connected between the said other side of said second tuned circuit and the amplifier plate whereby energy transfer through the interelectrode capacitance between the amplifier plate and the diode plate is substantially eliminated, a modulation wave amplifier connected to said impedance device, and a utilization circuit coupled to said modulation wave amplifier for deriving said demodulated signal therefrom.

5. In a modulated carrier wave signal receiving system, means for amplifying and demodulating said modulated carrier wave comprising an electron discharge device having a cathode, a plurality of grids including a control grid, an amplifier plate, and a diode plate, said control grid and said cathode being connected to circuit means whereby said carrier wave is impressed between said grid and said cathode, a first tuned circuit connected to said amplifier plate, a second tuned circuit magnetically coupled to said first tuned circuit for deriving a modulated carrier wave therefrom, one side of said second tuned circuit being connected to said diode plate, a diode load resistor connected between the other side of said second tuned circuit and said cathode, a capacitor connected in parallel with said diode load resistor, a second capacitor and resistor connected in series across said diode load resistor, a capacitive element connected between the said other side of said second tuned circuit and said amplifier plate, whereby energy transfer through the interelectrode capacitance between said amplifier plate and said diode plate is substantially eliminated, a modulation wave amplifier, circuit means connected between said second resistor and said modulation wave amplifier whereby said demodulated signal is supplied to said modulation wave amplifier, a signal reproducer, and circuit means connected between said modulation wave amplifier and said signal reproducer.

6. In combination a modulated carrier wave amplifier and demodulator comprising an electron discharge device having a cathode, a plurality of grids including a control grid, an amplifier plate, and a diode plate, an input circuit connected between said control grid and said cathode, a transformer having a tuned primary winding and a tuned secondary winding, one side of said tuned primary winding being connected to said amplifier plate, a decoupling capacitor connected between said cathode and the other side of said tuned primary winding, one side of said tuned secondary winding being connected to said diode plate, an impedance device connected between said cathode and the other side of said tuned secondary winding, and a reactive element connected between said other side of said tuned secondary winding and said amplifier plate.

7. In combination a modulated carrier wave amplifier and demodulator comprising an electron discharge device having a cathode, a plurality of grids including a control grid, an amplifier plate and a diode plate, an input circuit connected between said control grid and said cathode, a transformer having a tuned primary winding and a tuned secondary winding, one side of said tuned primary winding being connected to said amplifier plate, a decoupling capacitor connected between said cathode and the other side of said tuned primary winding, one side of said tuned secondary winding being connected to said diode plate, an impedance device connected between said cathode and the other side of said tuned secondary winding, and a capacitor connected between said other side of said tuned secondary winding and said amplifier plate.

8. In combination a modulated carrier wave amplifier and demodulator comprising an electron discharge device having a cathode, a plurality of grids including a control grid, an amplifier plate and a diode plate, an input circuit connected between said control grid and said cathode, a first tuned circuit, one side of said first tuned circuit being connected to said amplifier plate, a decoupling capacitor connected between said cathode and the other side of said first tuned circuit, a second tuned circuit coupled to said first tuned circuit for deriving a carrier wave therefrom, one side of said second tuned circuit being connected to said diode plate, an impedance device connected between said cathode and the other side of said second tuned circuit, and a reactive element connected between said other side of said second tuned circuit and said amplifier plate.

9. In combination a modulated carrier wave amplifier and demodulator comprising an electron discharge device having a cathode, a plurality of grids including a control grid, an amplifier plate and a diode plate, an input circuit connected between said control grid and said cathode, a transformer having a tuned primary winding and a tuned secondary winding, one side of said tuned primary winding being connected to said amplifier plate, a decoupling capacitor connected between said cathode and the other side of said tuned primary winding, one side of said tuned secondary winding being connected to said diode plate, a diode load resistor connected between said cathode and the other side of said tuned secondary winding, a capacitor connected in parallel with said diode load resistor, a second capacitor and resistor connected in series across said diode load resistor, and a reactive element connected between said other side of said tuned secondary winding and said amplifier plate.

10. In combination a modulated carrier wave amplifier and demodulator comprising an electron discharge device having a cathode, a plurality of grids including a control grid, an amplifier plate, and a diode plate, an input circuit connected between said control grid and said cathode, a transformer having a tuned primary winding and a tuned secondary winding, one side of said tuned primary winding being connected to said anode, a decoupling capacitor connected between said cathode and the other side of said tuned primary winding, one side of said tuned secondary winding being connected to said diode plate, a diode load resistor connected between said cathode and the other side of said tuned secondary winding, a capacitor connected in parallel with said diode load resistor, a second capacitor and resistor connected in series across said diode load resistor, and a third capacitor connected between said other side of said tuned secondary winding and said amplifier plate.

WEN YUAN PAN.

REFERENCES CITED

The following references are of record in the file of this patent:

UNITED STATES PATENTS

| Number | Name | Date |
|---|---|---|
| 2,005,789 | Koch | June 25, 1935 |
| 2,017,020 | Seeley | Oct. 8, 1935 |
| 2,038,285 | Harris | Apr. 21, 1936 |
| 2,151,757 | George | Mar. 28, 1939 |
| 2,452,132 | Lange | Oct. 26, 1948 |
| 2,453,078 | Posthumus | Nov. 2, 1948 |

FOREIGN PATENTS

| Number | Country | Date |
|---|---|---|
| 377,639 | Great Britain | July 28, 1932 |
| 487,627 | Great Britain | June 23, 1938 |